United States Patent [19]

Asai

[11] Patent Number: 4,481,600

[45] Date of Patent: Nov. 6, 1984

[54] APPARATUS FOR SPEEDING UP DIGITAL DIVISION IN RADIX-$2^n$ MACHINE

[76] Inventor: Hitohisa Asai, 892 Catalina Dr., Newport News, Va. 23602

[21] Appl. No.: 362,071

[22] Filed: Mar. 26, 1982

[51] Int. Cl.³ .............................................. G06F 7/52
[52] U.S. Cl. ................................................. 364/765
[58] Field of Search ............... 364/765, 761, 762, 763, 364/748

[56] References Cited

U.S. PATENT DOCUMENTS

| | | | |
|---|---|---|---|
| 3,234,367 | 2/1966 | Ottaway et al. | 364/761 |
| 3,633,018 | 1/1972 | Ling | 364/765 |
| 3,736,413 | 5/1973 | Ferguson | 364/761 |
| 3,777,132 | 12/1973 | Bennett, Jr. | 364/765 |
| 3,828,175 | 8/1974 | Amdahl et al. | 364/765 |
| 3,917,935 | 11/1975 | Lazecki | 364/761 |
| 4,025,773 | 5/1977 | Bennett | 364/765 |
| 4,364,115 | 12/1982 | Asai | 364/765 |

OTHER PUBLICATIONS

Sroboda, "An Algorithm for Division", *Information Processing Machine*, No. 9, 1963, pp. 25-34.

Ferrari, "A Division Method Using a Parallel Multiplier", *IEEE Trans. on Electronics Computers*, EC-16, Apr. 1967, pp. 224-226.

Chen, "Automatic Computation of Exponentials, Logarithms, Ratios, and Square Roots", *IBM J. Res. Develop.*, Jul. 1972, pp. 380-388.

Klir, "A Not on Svoboda's Algorithm for Division", *Information Processing Machine*, No. 9, 1963, pp. 35-39.

*Primary Examiner*—David H. Malzahn

[57] ABSTRACT

A division A/B where A and B are represented in a radix D can be accomplished by evaluating a power series. It is very important not only for the power series to converge but also to converge quickly in practical application. Thus, the convergence rate of the power series must be small in order to obtain a reasonably good approximation of the quotient by evaluating the first few terms. The acceleration method that guarantees to give a small convergence rate, $1/(2D-3)$, of the power series (see the section of the related application) was proposed with at most three successive applications of acceleration constants. This invention reduces the convergence rate, $1/(2D-3)$, to a smaller convergence rate, $1/(2mD-3)$, in the worst case where $m=1,2,2^2,2^3,2^4,\ldots$ and the three successive applications of acceleration constants to at most the two successive applications of the constants. These two reductions promise to yield faster division in digital computer.

8 Claims, 3 Drawing Figures

| S-SUBDIVISION NUMBER a  j | LOWER BOUNDARY IN OCTAL | UPPER BOUNDARY IN OCTAL | ROOT OF $g(q,(ma+j)m)=0$ IN S-SUBDIVISION |
|---|---|---|---|
| 1  0 | 5.31463.... | 7.00000... | 7.00000.... |
| 1  1 | 3.44444.... | 5.31463... | 4.25252.... |
| 2  0 | 2.43434.... | 3.44444... | 3.00000.... |
| 2  1 | 1.72135.... | 2.43434... | 2.14614.... |
| 3  0 | 1.35423.... | 1.72135... | 1.52525.... |
| 3  1 | 1.10421.... | 1.35423... | 1.22222.... |
| 4  0 | 0.703607... | 1.10421... | 1.00000.... |
| 4  1 | 0.536241... | 0.703607.. | 0.616161... |
| 5  0 | 0.414141... | 0.536241.. | 0.463146... |
| 5  1 | 0.310232... | 0.414141.. | 0.350350... |
| 6  0 | 0.217270... | 0.310232.. | 0.252525... |
| 6  1 | 0.136641... | 0.217270.. | 0.166116... |
| 7  0 | 0.0647562.. | 0.136641.. | 0.111111... |
| 7  1 | 0.0204102.. | 0.0647562. | NOT APPLICABLE |
| 8  0 | 0.00000.... | 0.0204102. | NOT APPLICABLE |

FIG. 2

APPARATUS FOR SPEEDING UP DIGITAL DIVISION IN RADIX-$2^n$ MACHINE

CROSS REFERENCE TO RELATED APPLICATIONS

Apparatus for digital division computation, Ser. No. 816,595, filed on July 18, 1977, now abandoned in favor of continuation-in-part of application Ser. No. 959,269, filed on Nov. 9, 1978 now U.S. Pat. No. 4,364,115.

BACKGROUND OF THE INVENTION

The present invention relates to a method and apparatus for division in data processing system and specially for floating point division in radix-$2^n$ digital computer where $n>1$.

Division by iterative multiplications has been implemented in the division process of digital computer. One technique described in "The IBM System/360 Model 91: Floating-point Execution Unit" IBM Journal of Res. & Develop. Vol. 11 No. 1, 1967 pp. 34-54 by S. F. Anderson et al. treats the dividend and divisor as numerator and denominator of a fraction. It accomplishes the division by multiplying both the numerator and denominator with the same sequence of convergence factors until the denominator approaches approximately unity. The resulting numerator then is considered an approximated quotient.

It is assumed the dividend and divisor are positive and normalized fractions in floating point number representation with the range $1>A, B \geq 1/D$ where D denotes a radix. This normalized range implies that the divisor can be expressed as $B=1-q$ for some q in the range $0<q \leq (D-1)/D$. The first multiplying factor is chosen as $R_o=1+q$ then $B_o=B \times R_o=(1-q)(1+q)=1-q^2$. The second multiplying factor is selected as $R_1=2-B_o=1+q^2$ then $B_1=B_o \times R_1=1-q^4$. In general, at the $i^{th}$ iteration, $R_i=1+q^{2^i}$ and $B_i=1-q^{2^{i+1}}$. Since $|q|<1$ and $q^{2^{i+1}}<\epsilon$, $B_i$ is an approximated unity where $\epsilon$ represents the least significant bit of the division register in computer. Thus, $AR_oR_1R_2 \ldots R_i$ is the desired quotient. The first multiplier $R_o$, determined by table-lookup, is 10 bits long and yields a minimum 0 or 1 string length of seven bits in $B_o$, namely 0.1111111xxx ... or 0.0000000xxx .. . where x is 0 or 1.

This technique is essentially an power series evaluation of $1/B$:

$$1/B = 1/(1+q)D = (1-q)(1+q^2)(1+q^4)(1+q^8)(1+q^{16})(1+q^{32}) \ldots /D$$

where $B=(1+q)D$ and $0<q \leq 1/(D-1)$. For 56-bits fraction, five multiplying factors, $R_o, R_1, R_2, R_3,$ and $R_4$ ($=1+q^{2^i}$ for $i=1,2,3,4$), are needed.

The acceleration method described in the related application was proposed to obtain a smaller value q from a given divisor. Then, the power series evaluation can be accomplished with a fewer number of multiplying factors with the smaller value where $|q| \leq 1/(2D-3)$ was guaranteed. In the acceleration method, three successive applications of acceleration constants are needed in order to obtain the smaller value q.

SUMMARY OF THE INVENTION

An object of this invention is to provide an improved high-speed division mechanism in radix-$2^n$ machine.

A further object of this invention is to implement a low-cost mechanism in division apparatus that performs high-speed division.

Dividend A and divisor B that are multiplied by successive acceleration constants result in $Aa_oa_1a_2/Ba_oa_1a_2$ and the constant multiplied divisor is of the form $Ba_oa_1a_2=D^{n+i}(1+q_i/D^{n+i})$ by using the iterative mapping function defined herein where i denotes the $i^{th}$ iteration and D is a radix. Note: The multiplication of $a_2$ ($=(mD-1)/m$) is accomplished by digit shift and subtraction.

BRIEF DESCRIPTION OF THE DRAWING

FIG. 2 is a table of the s-subdivision with $D=8$ and $m=2$.

DETAILED DESCRIPTION OF THE INVENTION

Since this invention is an improvement of the invention described in the section of Cross Reference to related applications, the previous invention is summarized here.

A division A/B may be evaluated through the power series:

$$A/B = \qquad (2.1)$$

$$A(1-P/D)(1+P^2/D^2)(1+P^4/D^4)(1+P^8/D^8)(1+P^{16}/D^{16}) \ldots /D$$

where D is the radix ($|D|>1$), $B=D+P$, and $|P/D|<1$. The power series involves no division operation ($1/D^n$ is a shift). The ratio $|P/D|$ must be small for fast convergence.

Let the divisor B be in the domain $(D^n, D^{n+1})$ where D and $D^n$ are base radix and pseudoradix respectively. Then $B=D^n+q_o$, where $q_o=P$ for $P>0$ and $q_o=D^{n+1}-D^n+P$ for $P<0$. When $P=0$, $A/B$ is reduced to a shift operation. The ratio $P/D^n$ to be used in eq. (2.1) is represented by a function of q:

$$P/D^n = f_1(q) = q/D^n \quad \text{for } P > 0 \qquad (2.2.a)$$

$$P/D^{n+1} = -f_2(q) = -\{D^{n+1} - (D^n + q)\}/D^{n+1} \qquad (2.2.b)$$
$$\text{for } P < 0$$

We introduce an overrelaxation parameter a in eq. (2.2.b) as follows:

$$-g_n(q,a) = -\{D^{n+1} - a(D^n + q)\}/D^{n+1}. \qquad (2.3)$$

The suffix n is an argument of the function and may be omitted for simplicity. By imposing $-g(q^+, a+1)=g(q^+,a)$ to determine the value of $q^+$, which is the boundary of subdivisions $S_a$ for $a=1,2,3,\ldots,D-1$, the following results are obtained $$q^+(a) = (2D - 2a - 1)D^n/(2a + 1) \qquad (2.4)$$

and $$S_1: ((2D - 3)D'/3, D'(D - 1)] \qquad (2.5.a)$$

$$S_a: ((2D - 2a - 1)D'/(2a + 1), \qquad (2.5.b)$$

-continued $$(2D - 2a + 1)D'/(2a - 1)] \text{ for } a = 2,3,4,\ldots,D-1$$

$$S_D: [0, D'/(2D - 1)] \quad (2.5.c)$$

where $D'$ denotes an appropriate pseudoradix.

By substituting eq. (2.4) into eq. (2.3), the local maxima of $g(q,a)$ in the subdivisions (i.e., the maximum ratios of $P/D'$) are $$-g(q^+(a), a) = 1/(2a+1) \text{ at } a = 1,2,3,\ldots,D-1. \quad (2.6)$$

Figure 1:
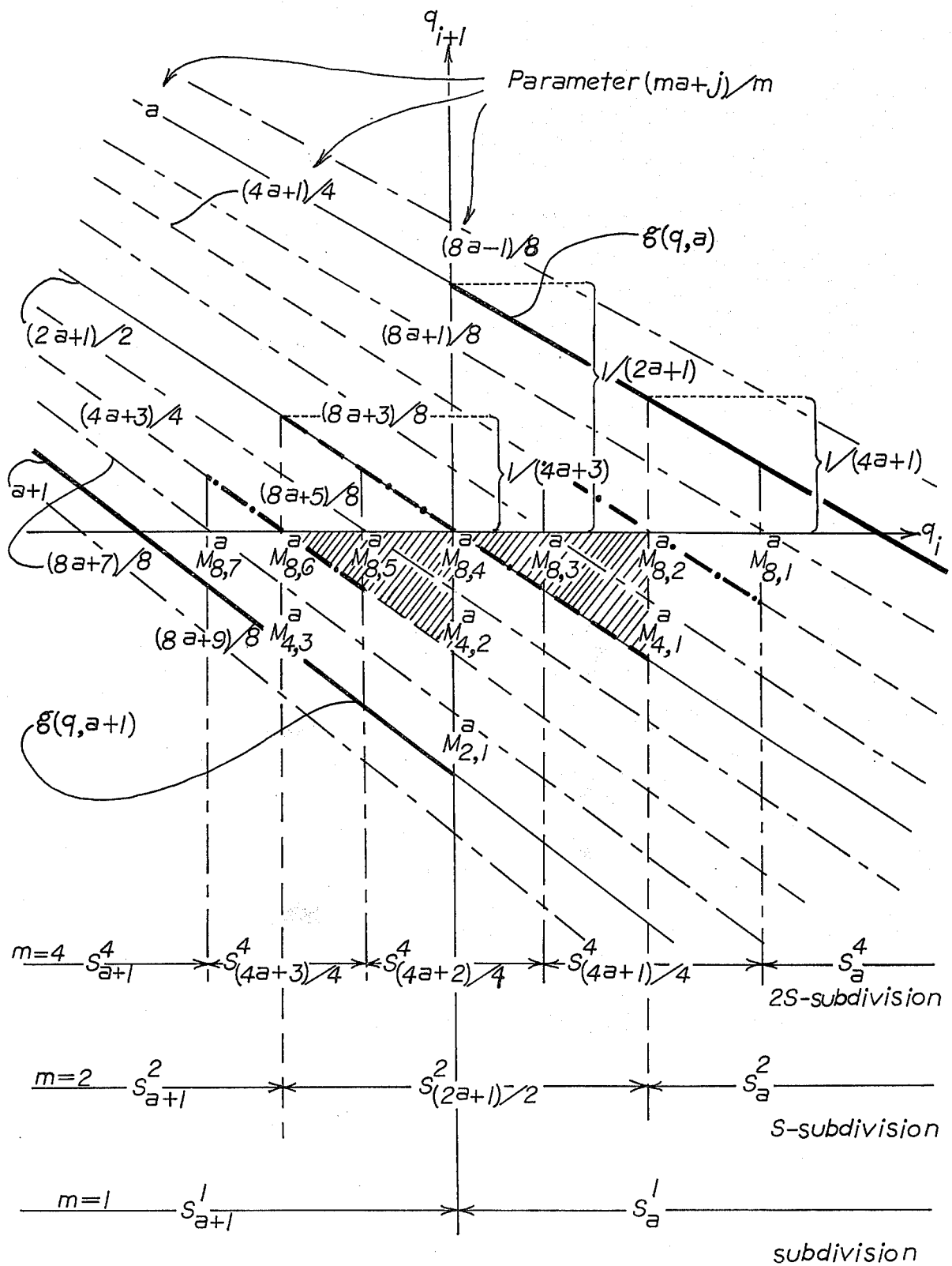
FIG. 1 depicts the boundary between subdivisions $S_a$ and $S_{a+1}$ which are defined herein.

FIG. 1 shows the area near the boundary between the subdivisions $S_a$ and $S_{a+1}$.

An iterative contracting map has been introduced by starting with $q_0$ and recursively applying $q_{i+1} = -g(q_i, a_i+1)D^n$. The movement of $q_0$ through the contracting mapping results in the subdivisions $S_{D-1}$ where the smallest ratio $P/D'$ — i.e., $q_f = g(q^*, D-1)$ in the domain $[D^{n+i}, D^{n+i+1}]$ — is obtained where $i$ denotes the number of iterations. The $q^*$ denotes the very last $q$ value in the recursive mapping; we can find this smallest ratio from eq. (2.6) with $a = D-2$.

Next, a generalized process of the method is described. A generalized parameter $(ma+j)/m$ is proposed for the overrelaxation where $m = 1,2,2^2,2^3,\ldots,D$, and $j$ is an integer $m > j \geq 0$. When $m = 1$ and $j = 0$, or $m = 1$ and $j = 1$, the parameter $(ma+j)/m$ becomes $a$ or $a+1$, respectively. This generalization thus includes the method discussed in the previous section. Moreover, the multiplication $ma$ and the division $1/m$ of the new parameter can be accomplished only by digit shift operations. Therefore, the use of the generalized parameter in the overrelaxation does not increase the number of multiplications in computing the reciprocal of divisor $B$.

Let us consider a boundary of subdivisions defined by eqs. (2.5). By taking the average of parameters $a$ and $a+1$ (i.e., $(2a+1)/2$) we find that the function $g(q,(2a+1)/2)$ intersects the abscissa at the point marked by $M_{2,1}{}^a$, shown in FIG. 1. Furthermore, the intersecting point found from $-g(q^+, a+1) = g(q^+, a)$ is the boundary between subdivisions $S_a$ and $S_{a+1}$. The number of subdivision intervals increases from $D$ to $2D-1$ when we adopt the averaged parameter. A new narrower interval like this is called a sub-subdivision. The lower-/upper boundaries of a sub-subdivision are $$q_L^+(a,j,m) = (2m(D - a) - 2j - 1)D^n/(2ma + 2j + 1) \quad (3.1)$$

and $$q_U^+(a,j,m) = (2m(D - a) - 2j + 1)D^n/(2ma + 2j - 1) \quad (3.2)$$

from conditions, $-g(q_L^+,(ma+j+1)/m) = g(q_L^+,(ma+j)/m)$ and $-g(q_U^+,(ma+j)/m) = g(q_U^+,(ma+j-1)/m)$ respectively, where $m = 2^l$ and $m-1 \geq j \geq 0$ for $a = 1,2,3,\ldots,D-1$ when $l=1$. There is, however, an exception in that the upper boundary of $S_1$ is $D'(D-1)$. The left-most sub-subdivision ($a=D$ and $j=0$) is bounded by $[0,D'/(2mD-1)]$. We shall abbreviate sub-subdivision as s-subdivision ($l=1$) and sub-sub-subdivision as 2s-subdivision ($l=2$), ..., and a $2^l$-subdivided sub- ... sub-subdivision as ls-subdivision. Thus, the domain $[0,D'(D-1)]$ of $q$ is divided into the following ls-subdivisions:

$$S_1: ((2m(D - 1) - 1)D^n/(2m + 1), D^n(D - 1)) \quad (3.3)$$

-continued $$S_{(ma+j)/m}: ((2m(D - a) - 2j - 1)D^n/(2ma + 2j + 1),$$
$$(2m(D - a) - 2j + 1)D^n/(2ma + 2j - 1)]$$
for $a = 1,2,3,\ldots,D-1$ and $j = 0,1,2,\ldots,m-1$ in each $a$ $$S_D: [0, D^n/(2mD - 1)]$$

with the parameter $(ma+j)/m = (2^l a+j)/2^l$. The boundary $q_L^+(a,j,m)$ is depicted in FIG. 1 with points marked by $M_{2m,2j+1}{}^a$ where $m=1$ and $j=0$ for a subdivision; $m=2$ and $j=0,1$ for a s-subdivision; and $m=4$ and $j=0,1,2,3$ for a 2s-subdivision.

Next, consider the mapped value of $q$ computed from $g(q,(ma+j)/m)$. By substituting eq. (3.2) into $g(q,(ma+j)/m)$, we obtain the value of $q$ as follows:

$$q = -g(q_U^+(a,j,m),(ma + j)/m) = 1/(2ma + 2j - 1) \quad (3.4)$$

As eq. (3.4) shows, the value of $q$ decreases as the value of $m$ increases. The worst case of $q_f$ for a fixed value $m$ is obtainable as $$|q_f| = |1/(2mD - 3)| = |1/(2^{l+1}D - 3)|. \quad (3.5)$$

by setting $a = D-1$ and $j = m-1$ in eq. (3.4).

The recursive application of $q_{i+1} = h(q_i,(ma_{i+1}+j_i)/m) = -g(q_i,(ma_i+j_i+1)/m)D^n$ by starting with the initial value $q_0$ in $S_{(ma_0+j_0)/m}$ assures the movement of successive mapping images of $q_0$ into the ls-subdivision $S_{(mD-1)/m}$ (when $a=D-1$ and $j=m-1$) or $S_D$. As soon as the last contracting image $q^*$ is reached in $S_{(mD-1)/m}$ or $S_D$, the smallest quantity $q_f$ is evaluated from $q_f = -g(q^*,(mD-1)/m)$ or $q_f = q^*$, depending on whether it has been reached in $S_{(mD-1)/m}$ or $S_D$, respectively, We have been discussing the first benefit of the generalized method. The second benefit is described below. Consider the difference between two values of $q$ computed from $g(q,(2ma+2j+1)/2m)$ and $g(q,(ma+j)/m)$. The difference is $(D^n+q)/2mD^{n+1}$, which can be seen in FIG. 1 as $1/(4a+3)$ indicated by a brace when $m=2$ and $j=1$ are used. From this, we may introduce a modified mapping function $h_m(q,a)$ where the suffix $m$ denotes the modification:

$$h_m(q,(ma + j)/m) = -g(q,(ma + j)/m)D^n \text{ if this is positive, or}$$

$$= -g(q,(2ma + 2j + 1)/2m)D^n =$$

$$-g(q,(ma + j)/m)D^n + (D^n + q)/2mD \text{ if}$$

$$-g(q,(ma + j)/m) \text{ results in a negative number.}$$

The mappings by $h_m(q,(ma+j)/m)$ for the cases $m=2$ and $j=1$, and $m=2$ and $j=0$ are indicated in FIG. 1 with the shaded triangles. The largest mapped values for each case occur at the points of $M_{2,1}{}^4$ and $M_{4,1}{}^4$ on the abscissa. Since $h_m(q,(ma+j)/m)$ is a piece-wise linear mapping, it is sufficient to consider only the largest possible mapped value of $q$ that happens to be the upper boundary of each ls-subdivision obtained through eq. (3.2).

Next, we present that the number of recursive applications for the worst case is two. By taking the worst initial $q_0 = q_U^+(a,j,m)$, the $q_1$ value is as follows;

$$q_1 = h_m(q_0,(ma_0 + j_0)/m) = D^n/(2ma_0 + 2j_0 - 1) \quad (3.6)$$

where $q_o$ belongs in $S_{(ma_o+j_o)/m}$ initially. It is obvious that if $a_o=1$ and $j_o=0$, $q_1$ is greater than the upper boundary $(3D^n/(2mD-3))$ obtained by substituting $a=D-1$ and $j=m-1$ in eq. (3.3)) of the ls-subdivision $S_{(mD-1)/m}$. So another contraction mapping of $h_m(q_1,(ma_1+j_1)/m)$ is required to obtain a smaller value.

First, we must determine the corresponding $a_1$ and $j_1$ for the value $q_1$ from following inequalities obtained from the ls-subdivision boundaries in eq. (3.3):
$(2m(D-a_1)-2j_1-1)D^n/(2ma_1+2j_1+1) < D^n/(2ma_o+2j_o-1) \leq (2m(D-a_1)-2j_1+1)D^n/(2ma_1+2j_1-1)$
After a simple computation, we obtain $$ma_1+j_1 = \lfloor ((2mD+1)(2ma_o+2j_o-1)+1)/(-4ma_o+4j_o) \rfloor \quad (3.7)$$

where $\lfloor R \rfloor$ denotes an integer in the range $R-1 < \lfloor R \rfloor \leq R$, and R is a real number.

Next, by using the value $q_1$ and by determining $a_1$ and $j_1$ from the inequalities, $R-1 < \lfloor R \rfloor \leq R$, the interval bound of $q_2$ is determined as follows: (1) When the inequality $\lfloor R \rfloor \leq R$ is used, the upper bound of the interval range is $$q_2 = h_m(q_1,(ma_1+j_1)/m) \leq (ma_o+j_o)D^n/(2ma_o+2j_o-1)mD. \quad (3.8)$$

Since the last term of eq. (3.8) is positive, there is no need to have the difference term, $(D^n+q_1)/2mD$, in $h_m(q,a)$. Then, we compare the upper bound of $q_2$ with the upper bound of $S_{(mD-1)/m}$:

$$3D^n/(2mD-3)-(ma_o+j_o)D^n/(2ma_o+2j_o-1)mD = ((4(ma_o+j_o)-3)mD+3(ma_o+j_o))D^n/(2mD-3)(2ma_o+2j_o-1)mD \quad (3.9)$$

Eq. (3.9) results in a positive number, so $q_2$ must belong in $S_{(mD-1)/m}$ since $4(ma_o+j_o)-3>0$, $2mD-3>0$, and $(2ma_o+2j_o-1)>0$ by taking the smallest values of $a_o=1$, $j_o=0$, $m=1$, and $D=2$, and no further mapping is needed. (2) When the inequality $R-1 < \lfloor R \rfloor$ is used, the lower bound of the interval range is found as follows:

$$q_2 > -(ma_o+j_o)D^n/(mD(2ma_o+2j_o-1)) \quad (3.10)$$

Eq. (3.10) results in a negative value when the smallest values of $a_o$, $j_o$, m and D are taken. Therefore, this negative value is replaced by $(D^n+q_1)/2mD = (ma_o+j_o)D^n/(mD(2ma_o+2j_o-1))$, which is the largest value in $h_m(q_o,(ma_o+j_o)/m)$, namely $M_{2m,2j}{}^a$ for $m=2,4$ and $j=1,2$ respectively, as shown in FIG. 1. It is sufficient to compare the largest value with the upper bound of $S_{(mD-1)/m}$:

$$3D^n/(2mD-3) - (ma_o+j_o)D^n/mD(2ma_o+2j_o-1) \quad (3.11)$$
$$= mD(4(ma_o+j_o)-3) + 3(ma_o+j_o)$$

Eq. (3.11) is positive when the smallest values of $a_o$, $j_o$, m and D are taken. Thus, from these two cases we find the value of $q_2$ is in $S_{(mD-1)/m}$ or $S_D$. Then, the final value of $q_f$ is computed as follows:

$$|q_f| = |-g(q_2,(mD-1)/m)| \leq |1/(2mD-3)|. \quad (3.12)$$

An example of the generalized process: Let $A=1$ be a dividend and $B=54$ a divisor in decimal. By taking the base radix $D=8=10_8$ and $n=1$, the value of P is found to be $56_8$ as follows: $B=D^n+P=54_{10}66_8$. All computation in the example is carried out in octal with $m=2$ by using the s-subdivision shown in FIG. 2 a computed from eq. (3.3).

Step 1: Since $B=10+56$, $q_o=56$. From FIG. 2 and the value $q_o/D^n = 56/10 \approx 5.6$, we find $a_o=1$ and $j_o=0$ in the s-subdivision. Set $i=0$ and $\alpha=1$.

Step 2: Since $q_0$ is not in $S_{(2D-1)/2}$ nor in $S_D$, go to the next step.

Step 3: Compute $q_1 =$ $$-\{D^{n+i+1} - ((4a_o+2j_o+1)/4)(D^{n+i}+q_o)\}/D =$$
$$-\{100 - (5/4)(10+56)\}/10 = 34/100 = 0.34.$$

Since $q_0(=56)$ is less than the root, 7.0, of the s-subdivision as shown in FIG. 2 ($q_1 - = g(q_o,(ma_o+j_o)/m) < 0$), the quantity $(D^{n+i}+q_i)/2mD$ is added to $q_1$, namely the acceleration constant $(2ma_i+2j_i+1)/2m$ is used in the $q_{i+1}$ and $\alpha(=\alpha(2ma_o+2j_o+1)/2m=1\times(5/4)=5/4)$ computations. Increase the counter i by one, $i=i+1=0+1=1$.

Step 4: Now the value $q_1/D^n$ becomes $q_1/D^n=0.34/10=0.034$. By searching the s-subdivisions in FIG. 2, we find that $q_1$ is in the s-subdivision with $a_1=D-1$ and $j_1=1$. Since the quantity $q_1$ is now in $S_{(mD-1)/m}$, go to step 5.

Step 5: Compute the final $q_f$ $$q_f = -\{D^{n+i+1} - ((2a_1+j_1)/2)(D^{n+i}+q_i)\}/D^{n+i+1}$$
$$= -\{1000 - (17/2)(100+3.4)\}/1000 = -56/10^4 \text{ and}$$

$$\alpha = \alpha(2a_1+j_1)/2 = (5/4)(17/2) = 113/10.$$

Step 6: Compute the power series $$\alpha = \alpha/(1+q_f)D^{n+i+1} = \alpha(1-q_f)(1+q_f^2)(1+q_f^4)(1+q_f^8)(1+q_f^{16})\ldots/D^{n+i+1}$$

$$= (113/10)(1+56/10^4)(1+56^2/10^8)(1+56^4/10^{16})(1+56^8/10^{32})(1+56^{16}/10^{64})\ldots/10^3$$

$$= 1136572(1+56^2/10^8)(1+56^4/10^{16})(1+56^8/10^{32})(1+56^{16}/10^{64})\ldots/10^8$$

$$= 113664113422150(1+56^4/10^{16})(1+56^8/10^{32})(1+56^{16}/10^{64})\ldots/10^{16}$$

$$= 0.0113664113664113365336206\ldots(1+56^8/10^{32})\ldots$$

Comparing the real quotient, $1/66_8 = 0.\overline{0113664}$, with the approximate reciprocal, we find the results accurate up to 9 or 17 digits when the terms of the power series are evaluated up to $q_f^2$ or $q_f^4$, respectively.

FIG. 1 illustrates the boundary of subdivisions $S_{a+1}^1$ and $S_a^1$; the intervals of s-subdivisions $S_{a+1}^2$, $S_{(2a+1)/2}^2$, and $S_a^2$; and the intervals of 2s-subdivisions $S_{a+1}^4$, $S_{(4a+3)/4}^4$, $S_{(4a+2)/4}^4$, $S_{(4a+1)/4}^4$, and $S_a^4$. The difference terms, $1/(2ma+2j+1)$, in $h_m(9,(ma+j)/m)$ are indicated by the brace with $1/(2a+1)$ at the lower boundary of subdivision $S_a^1$ (when $m=1$ and $j=0$) and by the braces with $1/(4a+3)$ and $1/(4a+1)$ at the lower boundaries of s-subdivisions $S_{(2a+1)/2}^2$ and $S_a^2$ (when $m=2$ and $j=1,0$) respectively. Two dark solid lines, one dark dotted line and three dark chained lines represent the functions of $g(q,(ma+j)/m)$ in (a) the cases $m=1$ and $j=0,1$ for the dark solid lines, in (b) the case $m=2$ and $j=1$ for the dark dotted line, and in (c) the cases $m=4$ and $j$ 1,2,3 for the dark chained lines, respectively.

FIG. 2 is the table of the s-subdivision computed from eqs. (3.3) and the roots of $g(q,(ma+j)/m)=0$ in each s-subdivision.

Figure 3:
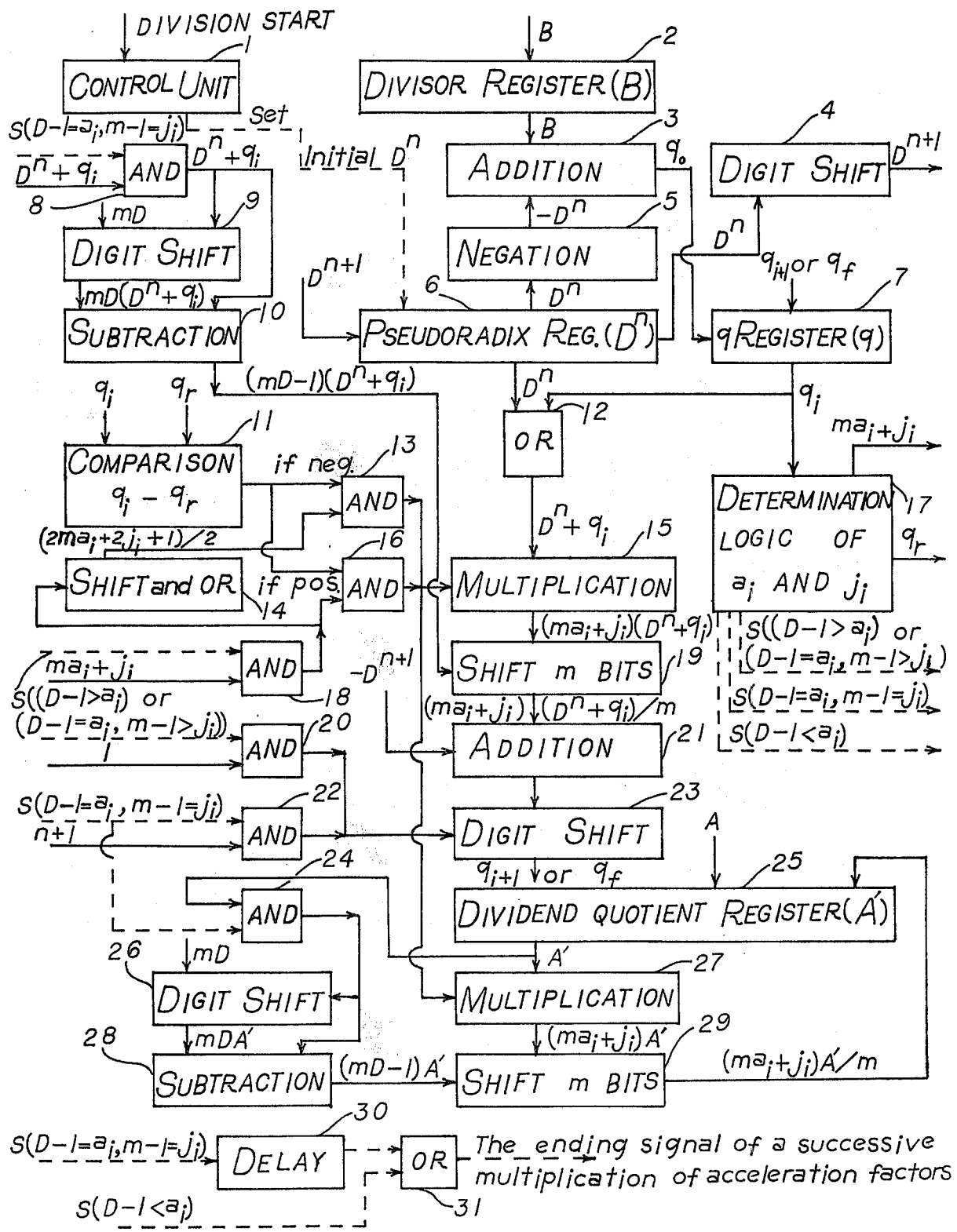
FIG. 3 is an operational block diagram indicating a performing logic of iterative multiplications of the acceleration constant to dividend A and divisor B.

FIG. 3 shows the successive multiplication of acceleration constants to dividend and divisor. When the control unit 1, comprising sequential circuitry, has received a division start signal after storing dividend A and divisor B into the dividend/quotient register 25 and the divisor register 2, respectively, the control unit resets the pseudoradix register 6 with a predetermined pseudoradix $D^n$. Each of these three registers and the q register 7 is structured in a row of associated flipflops. Then the control unit commands the negation logic 5 to get $-D^n$ and starts the addition 3 to obtain $q_o$. The resultant $q_o$ is stored in the q register 7. Next, the control unit initiates the determination logic of $a_i$ and $j_i$, comprising combinational logic circuits and Read Only Memory (ROM) of a table, that provides a control signal, $s(D-1<a_i)$, $s(D-1=a_i, m-1=j_i)$ or $s((D-1>a_i)$ or $(D-1=a_i, m-1>j_i))$ by comparing $a_i$ and $j_i$ with $D-1$ and $m-1$ respectively, and an acceleration constant $ma_i+j_i$ and the root of $g(q_i, (ma_i+j_i)/m)=0$ as the output from the input $q_i$. At the same time, the control unit starts the process of making the quantity $D^n+q_i$ that reaches the multiplication 15 through the OR logic 12. Subsequently, the control unit regulates the following operations.

If a signal $s((D-1>a_i)$ or $(D-1=a_i, m-1>j_i))$ is generated, then the signal is used to open the paths of the AND logic gates 18 and 20 for the acceleration constant and for one, respectively. The constant passing the gate is sent to the shift and OR operation 14 to make the quantity $(2ma_i+2j_i+1)/2$ which is the modified acceleration constant in $h_m(q_i,(ma_i+j_i)/m)$. The comparison $q_i-q_r$ until 11 generates the result whether the difference of $q_i-q_r$ is positive or negative. If the negative value of the comparison occurs then the AND logic gate 13 is opened for the path of the modified acceleration constant, $(2ma_i+2j_i+1)/2$, to the multiplications 15 and 27. If the positive value results then the AND logic gate 16 is opened for the path of the acceleration constant, $ma_i+j_i$, to the multiplications 15 and 27. After the multiplication 15 of the acceleration constant to $D^n+q_i$ is completed, the sequential process, (1) $(ma_i+j_i)(D^n+q_i)/m$ or $(2ma_i+2j_i+1)(d_n+g_i)/2m$ by the shift m bits operation 19, (2) $-D^{n+1}+(ma_i+j_i)(D^n+q_i)/m$ or $-D^{n+1}+(2ma_i+2j_i+1)(D^n+q_i)/2m$ by the addition 21, and (3) $q_{i+1}=(-D^{n+1}+(ma_i+j_i)(D^n+q_i)/m)/D$ or $(-D^{n+1}+(2ma_i+2j_i+1)(D^n+q_i)/2m)/D$ by the digit shift 23, is initiated. Then, the quantity $q_{i+1}$ is stored back in the q register 7.

The acceleration constant passed the AND logic gate 13 or 16 is used in the multiplication 27 to form the quantity $(ma_i+j_i)A'$ or $(2ma_i+2j_i+1)A'/2$ where $A'$ denotes the content of the dividend/quotient register 25. Then, the shift m bits operation 29 is performed to produce the next content of the dividend/quotient register. After the present content of the pseudoradix register 6 is sent to the multiplication 15 through the OR logic gate 12, the digit shift operation 4 is applied to the content of the register 6 to get the next iteration value in it. A process forming the new contents of the pseudoradix register 6, the q register 7, and the dividend/quotient register 25 described above is one iteration of the successive multiplication of acceleration constants.

If a signal $s(D-1=a_i, m-1=j_i)$ is generated by the determination logic of $a_i$ and $j_i$, the logical AND gates 8, 22, and 24 are opened for passing the quantities $D^n+q_i$, $n+1$, and $A'$, respectively. Then, the quantity $D^n+q_i$ is used to make the quantity $(mD-1)(D^n+q_i)$ by the digit shift 9 and the subtraction 10. This resultant becomes the value of $q_f$ after the shift m bits operation 19, the addition 21 of $-D^{n+1}$, and the digit shift 23, namely $q_f=(-D^{n+1}+(mD-1)(D^n+q_i)/m)/D^{n+1}$, which is stored back in the q register. Also the multiplication $(mD-1)A'/m$ is performed through the digit shift 26 producing $mDA'$, the subtraction 28 making $(mD-1)A'$, and the shift m bits operation 29 resulting $(mD-1)A'/m$. The result is stored back in the dividend/quotient register. After the completion of the two multiplications of $(mD-1)/m$, namely after the delaying at the delay unit 30, the control signal $s(D-1=a_i, m-1=j_i)$ becomes the ending signal of the successive multiplication of acceleration constants.

When a signal $s(D-1<a_i)$ is generated by the determination logic of $a_i$ and $j_i$, the contents of the q register and of the dividend/quotient register become the results of the successive multiplication of acceleration constants. So the signal is the termination signal of the successive multiplication through the OR logic 31. Typical structures of the functions of the determination logic of $a_i$ and $j_i$, and of the evaluation process of the power series are similar to the ones described in the FIGS. 7 and 8 of the filed application Ser. No. 959,269, now U.S. Pat. No. 4,364,115.

While the above description contains many specificities, these should not be construed as limitations on the scope of the invention, but rather as an exemplification of one preferred embodiment thereof. Many other variations are possible, for example if a parallel process provides the remainder of $A/B$ where $A>B$, then this process is useful in integer number division. The parallel process is successive applications of Horner's scheme on the polynomial form $(\ldots(A_mP+A_{m-1})P+\ldots+A_1)P+A_o$ where $A_i$ for $i=0,1,2,\ldots,m$ are digits of $A=(\ldots(A_mD'+A_{m-1})D'+\ldots A_1)D'+A_o$ and $P=D'-B$, and the applications continue on the evaluated result of Horner's scheme again and again until the very last result becomes less than $D'$. Suppose $A=10000_8$ in the example where $P=12_8$ and $D'=D^2=100_8$. A computation is shown here. The first and second applications of Horner's scheme result in $(1\times P+00)\times P+00=(1\times 12)\times 12=144$ and $1\times 12+44=56$. Then the last result 56 is less than 100 and is less than $B=66$. So the remainder is $56_8=46_{10}$. When the last value is greater than B, the difference between the last value and the divisor (or a multiple of the divisor) becomes the remainder if P is less than B. If P is greater than B, a smaller P may be chosen by taking the difference between P and B. Accordingly, the scope of the invention should be determined not by the embodiment illustrated, but by the appended claims and their legal equivalents.

What is claimed is:

1. An apparatus for speeding up convergence division computation for producing a quotient by performing successive multiplication operations comprising:

divisor register means for receiving and storing a divisor quantity B, dividend/quotient register means for receiving and storing A', wherein the initial A' is a dividend quantity A, pseudoradix register means for receiving and storing a predetermined pseudoradix $D^n$, wherein D is the radix and n is an integer, first means, connected to said pseudoradix register means and said divisor register means, to compute a quantity $q_0 = B - D^n$, q register means, connected to said first means, to receive and store $q_i$, wherein $i = 0, 1, \ldots$, logic means, connected to said q register means, to determine acceleration factors $a_i$ and $j_i$, acceleration constant $ma_i + j_i$, and $q_r$ wherein m is an integer chosen from a set $\{1, 2, 2^2, 2^3, \ldots, D\}$, and to generate control signals corresponding to each condition (1) $((D-1 > a_i)$ or $(D-1 = a_i$ and $m-1 > j_i))$, (2) $(D-1 = a_i$ and $m-1 = j_i)$, and (3) $(D-1 < a_i)$, by table lookup of an ls-subdivision table using $q_i$ wherein table entries comprise interval quantities and roots of $q_r$, second means, connected to said pseudoradix register means and said q register means, to compute $D^n + q_i$, third means, connected to said logic means, to selectively generate acceleration constant $ma_i + j_i$ and modified acceleration constant $(2ma_i + 2j_i + 1)/2$, first multiplication means, connected to said second means and to said third means, to compute $(ma_i + j_i)(D^n + q_i)$ and $(2ma_i + 2j_i + 1)(D^n + q_i)/2$, fourth means, connected to said logic means and said second means, to compute $(mD-1)(D^n + q_i)$, first shift means, connected to said first multiplication means, said fourth means, and said logic means, to selectively shift $(ma_i + j_i)(D^n + q_i)$ and $(mD-1)(D^n + q_i)$ by m bits, fifth means, connected to said pseudoradix register means, to compute $D^{n+1}$, sixth means to combine the outputs of the first shift means and the fifth means, seventh means, responsive to said control signals corresponding to conditions (1) $((D-1 > a_i)$ or $(D-1 = a_i$ and $m-1 > j_i))$ and (2) $(D-1 = a_i$ and $m-1 = j_i)$, for passing 1 and $n+1$ respectively, second shift means, connected to said sixth means, sand seventh means, and said q register means, for computing $q_i$ for $i > 0$, second multiplication means, connected to said dividend/quotient register means and said third means to selectively multiply the acceleration constant and the modified acceleration constant by the output of said dividend/quotient register means, to compute a successive A' by $A'(ma_i + j_i)$ and a successive A' by $A'(2ma_i + 2j_i + 1)/2$, eighth means, connected to said dividend/quotient register means and said logic means, to multiply the output of said dividend/quotient register means by $(mD-1)$, to compute a successive A' by $A'(mD-1)$, and third shift means, connected to said second multiplication means, said eighth means, said logic means and said dividend/quotient register means, to selectively shift the outputs of said second multiplication means and said eighth means by m bits and to feed the shifted quantity to said dividend/quotient register means.

2. The apparatus for speeding up convergence division computation set forth in claim 1 including:

successive means for recursively determining $q_i$ for $i > 0$ through activating selectively and repeatedly the following means: (1) said first means, (2) said logic means, (3) said second means, (4) said third means, (5) said first multiplication means, (6) said first shift means, (7) said fifth means, (8) said sixth means, (9) said seventh means, (10) said second shift means, and (11) said fourth means; and for recursively determining A' through activating selectively and repeatedly the following means: (1) said logic means, (2) said third means, (3) said second multiplication means, (4) said third shift means, and (5) said eighth means until said logic generates a control signal corresponding to a condition, $(D-1 = a_i$ and $m-1 = j_i)$ or $(D-1 > a_i)$.

3. The apparatus for speeding up convergence division computation set forth in claim 1 wherein:

said interval quantities comprise register means for storing numerical values determined by $(D-1)D^n$, $(2m(D-1)-1)D^n/(2m+1)$, $\ldots$, $(2m(D-a)-2j-1)D^n/(2ma+2j+1)$, $\ldots$, $D^n/(2mD-1)$, 0, wherein $(2m(D-a)-2j-1)D^n/(2ma+2j+1)$ represents the terms for $a = 1, 2, 3, \ldots, D-1$ and $j = 0, 1, 2, \ldots, m-1$ in each a.

4. The apparatus for speeding up convergence division computation set forth in claim 1 wherein:

said roots or $q_r$ comprise register means for storing numerical values determined by the relationship $$q_r = (mD - (ma+j))D^n/(ma+j)$$

for $a = 1, 2, 3, \ldots, D-1$ and $j = 0, 1, 2, \ldots, m-1$ in each a.

5. The apparatus for speeding up convergence division computation set forth in claim 1 wherein:

said first multiplication means includes means (1) for selecting $(ma_i + j_i)(D^n + q_i)$ when $q_i$ is greater than $q_r$ and (2) for selecting $(2ma_i + 2j_i + 1)(D^n + q_i)/2$ when $q_i$ is less than $q_r$.

6. The apparatus for speeding up convergence division computation set forth in claim 1 wherein:

said second multiplication means includes means (1) for selecting $A'(ma_i + j_i)$ when $q_i$ is greater than $q_r$ and (2) for selecting $A'(2ma_i + 2j_i + 1)/2$ when $q_i$ is less than $q_r$.

7. The apparatus for speeding up convergence division computation set forth in claim 1 wherein:

said first shift means includes means for selectively shifting $(2ma_i + 2j_i + 1)(D^n + q_i)/2$ by m bits.

8. The apparatus for speeding up convergence division computation set forth in claim 1 wherein:

said logic means includes (1) means for comparing $q_i$ with said interval quantities, (2) means for recursively determining said acceleration constant $ma_i + j_i$ by the relationship $ma_{i+1} + j_{i+1} = \lfloor ((2mD+1)(2ma_i + 2j_i - 1) + 1)/(-4ma_i + 4j_i) \rfloor$ for $i \geq 0$ wherein $\lfloor R \rfloor$ denotes an integer in the range $R - 1 < \lfloor R \rfloor \leq R$ and R is a real number, and (3) means for selectively choosing a root of $q_r$ corresponding to a $q_i$ value by using a determined pairvalue $(a_i, j_i)$.

* * * * *